July 9, 1935.  H. R. TEAR  2,007,698
ASSEMBLING MACHINE
Filed Sept. 19, 1933  7 Sheets-Sheet 2

INVENTOR.
HARRY R. TEAR
BY
John A. Watson
ATTORNEY.

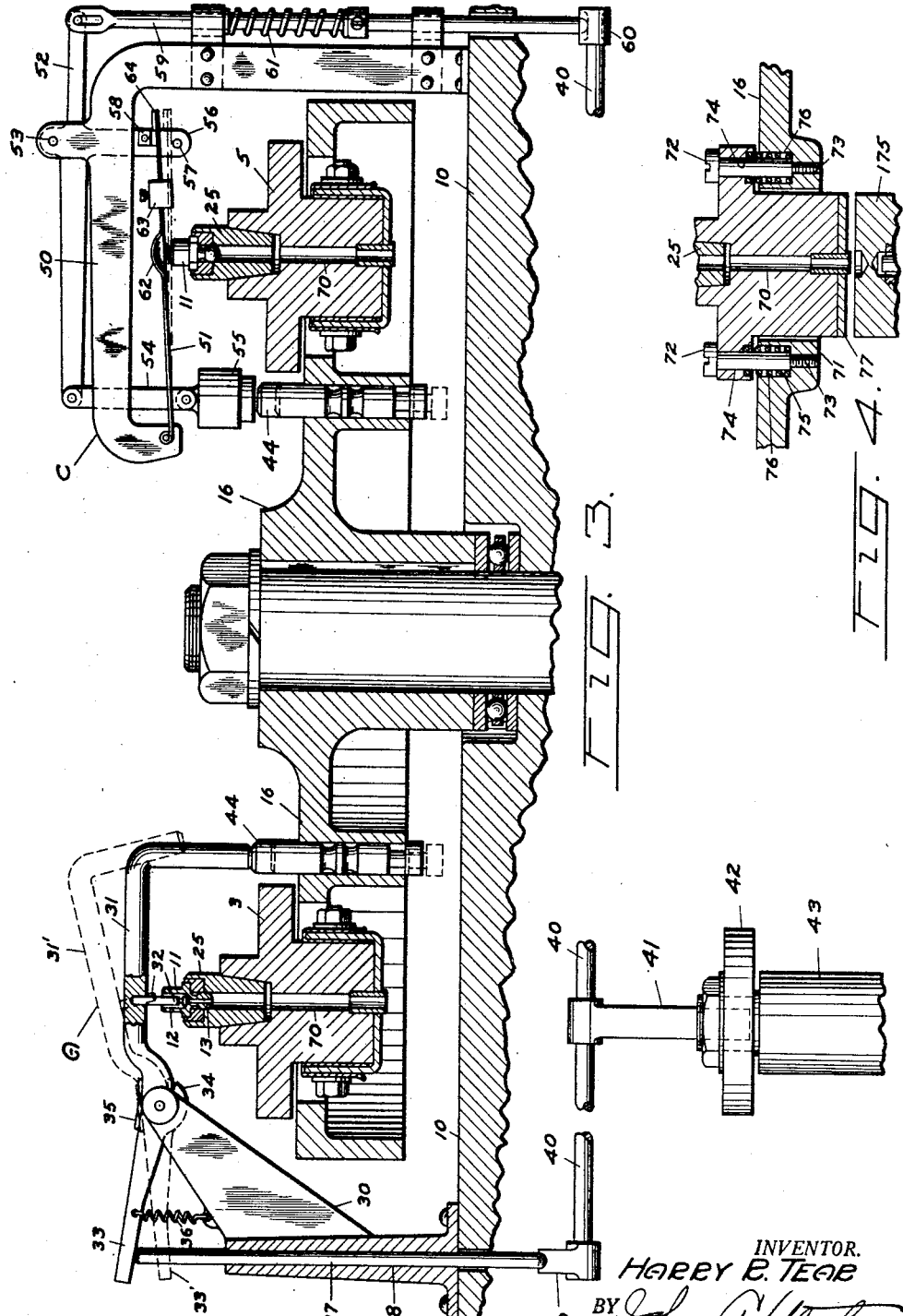

July 9, 1935.  H. R. TEAR  2,007,698
ASSEMBLING MACHINE
Filed Sept. 19, 1933  7 Sheets-Sheet 4

INVENTOR.
HARRY R. TEAR
BY John A. Watson
ATTORNEY

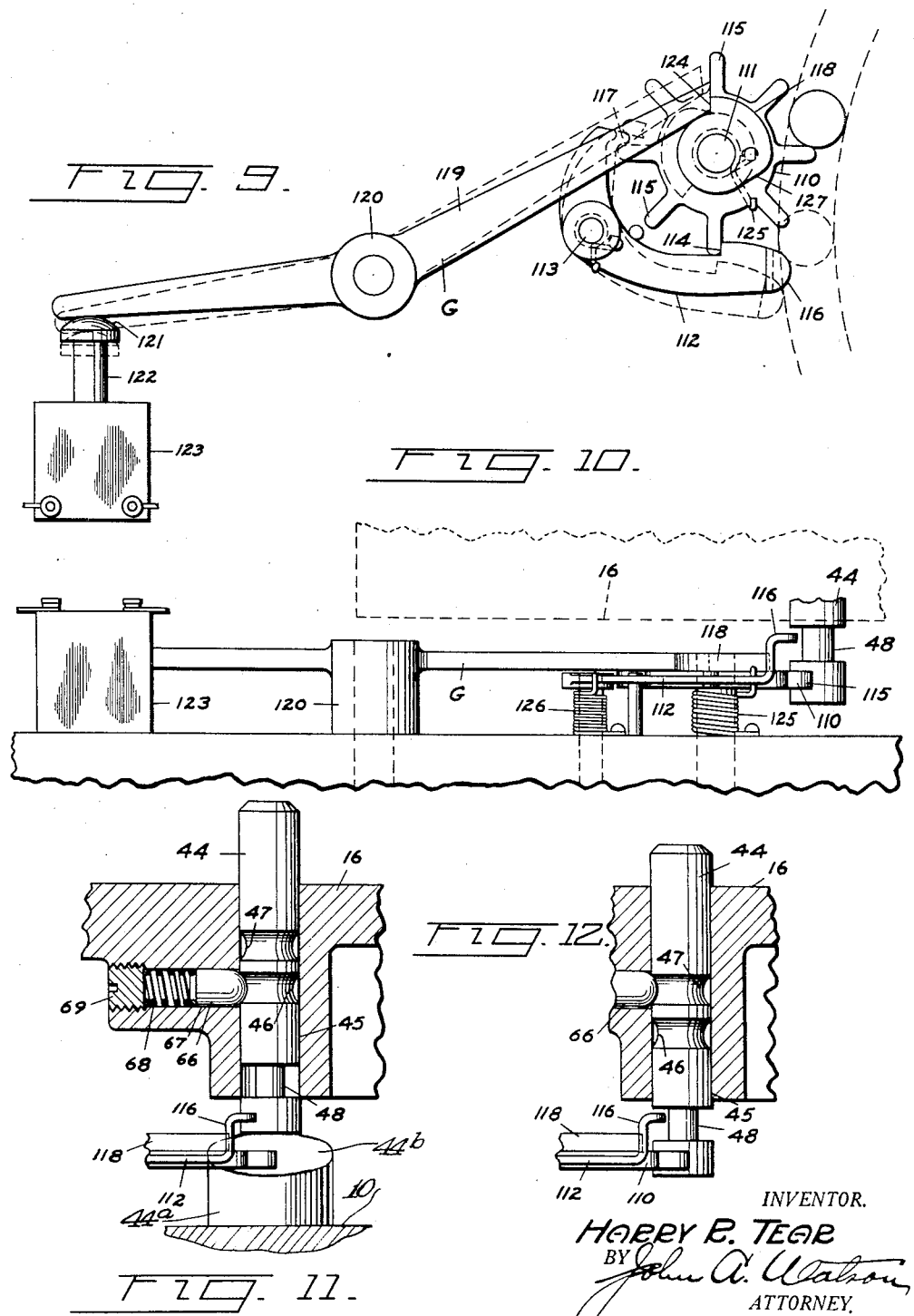

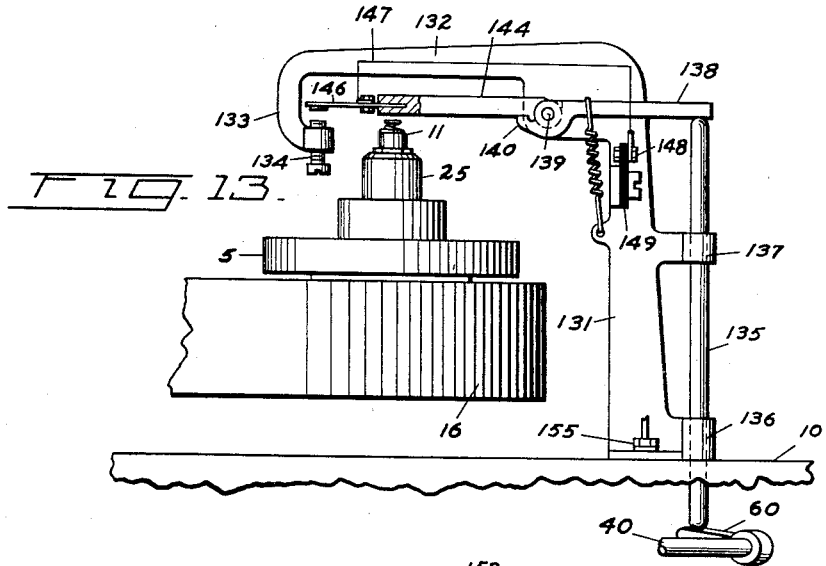
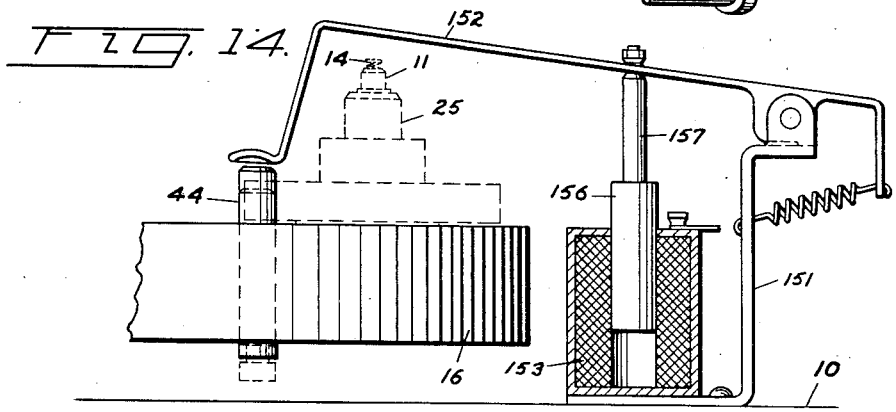
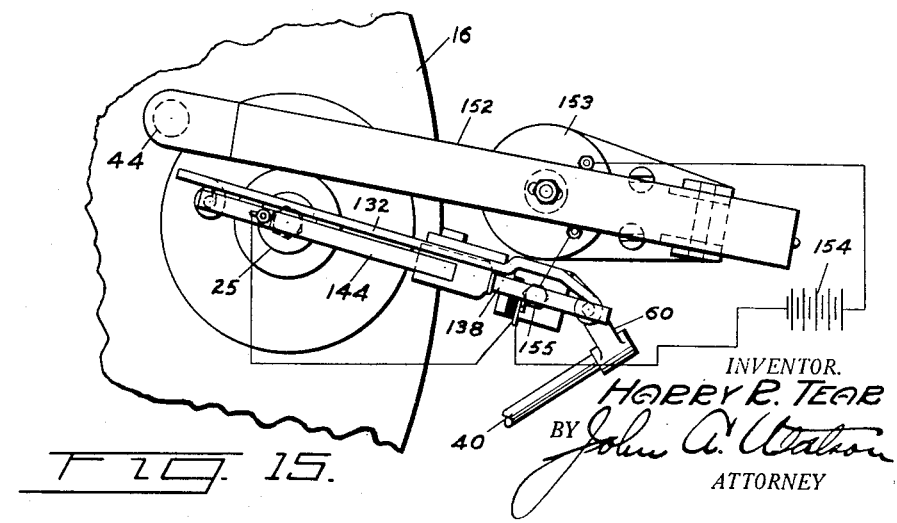

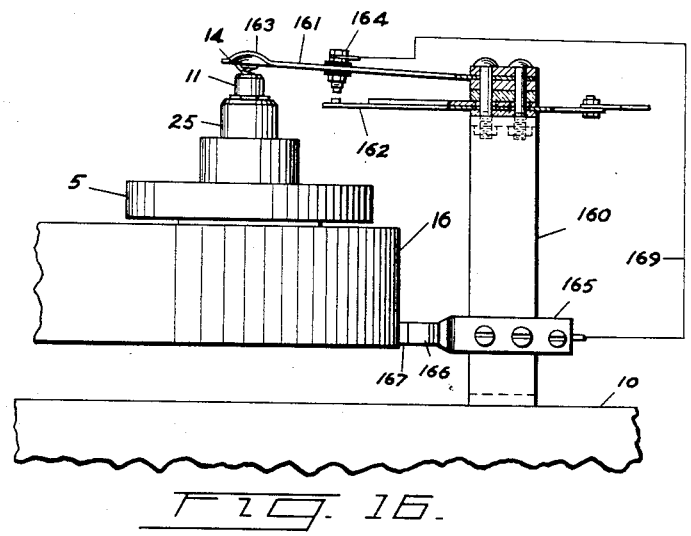
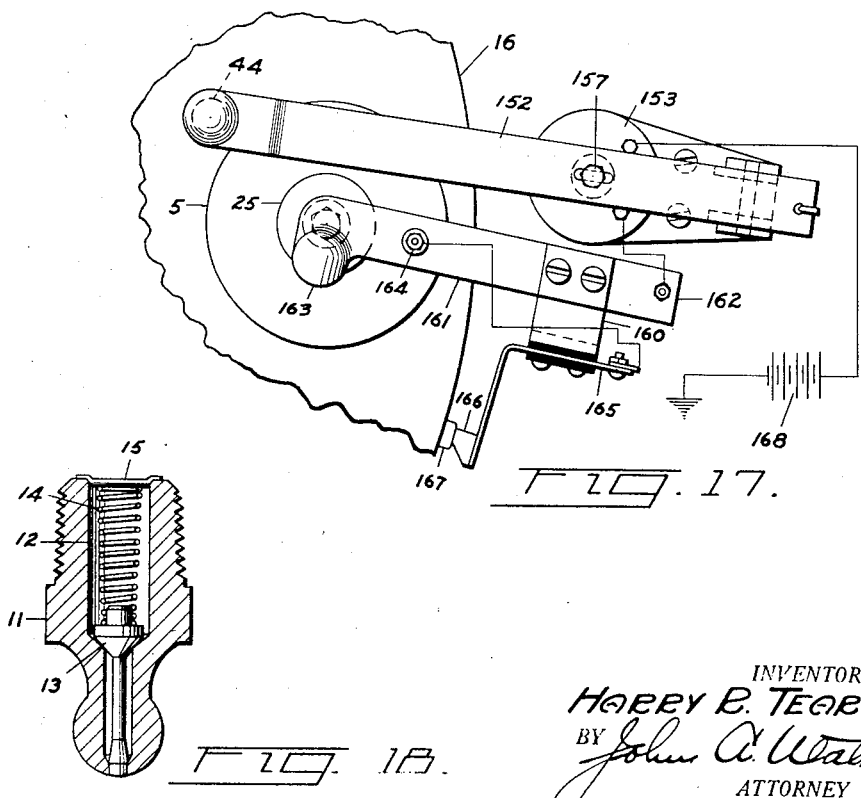

Patented July 9, 1935

2,007,698

UNITED STATES PATENT OFFICE 2,007,698

ASSEMBLING MACHINE

Harry R. Tear, South Bend, Ind., assignor to The Lubrication Corporation, South Bend, Ind., a corporation of Delaware Application September 19, 1933, Serial No. 690,169

18 Claims. (Cl. 29—84)

This invention relates to improvements in assembling machine and more particularly to those features of an automatic assembling machine for lubrication fitting, or nipples, whereby defective or improperly assembled elements are ejected throughout the several successive operating stages as the defective element is fed through the machine or after an error in assembly occurs.

An object of the invention is to separate good fittings from defective fittings during the assembly process thereby reducing the amount of inspection required.

Another object is to prevent the waste of parts which would be incurred if the machine completed assembly of fittings with valves or springs missing.

A further object of the invention is to draw the attention of the operator in case the machine fails to function properly and furthermore to shut down the machine should it continue to operate after ejecting a predetermined number of defective fittings.

Other objects, the advantages, and uses will be, or should become, apparent after reading the following specification and claims and after consideration of the drawings forming a part of the specification wherein:

Fig. 3 is a sectional view along the line III—III of Fig. 2;

Fig. 4 is a fragmentary sectional view along the line IV—IV of Fig. 2;

Fig. 9 is an enlarged plan view of mechanism for shutting down the machine in case of repeated faulty operation;

Fig. 10 is a side elevation of the mechanism shown in Fig. 9;

Fig. 11 is a fragmentary section along the line XI—XI of Fig. 2 showing the rejection pin in its normal or raised position;

Fig. 12 is a view similar to Fig. 11 showing the rejection pin in its rejecting position;

Fig. 13 is a fragmentary sectional elevation of another form of the mechanism for detecting the presence of the spring in the fitting;

Fig. 14 is a fragmentary sectional elevation of a form of mechanism that may be used in cooperation with that shown in Fig. 13 to set the "rejection" pin in its rejecting position;

Fig. 15 is a plan view of the mechanism of Figs. 13 and 14;

Fig. 16 is a fragmentary sectional elevation of still another form of mechanism for detecting the presence of the spring in the fitting;

Fig. 17 is a plan view of the mechanism of Fig. 16; and

Fig. 18 is a vertical sectional view of a lubricant fitting illustrating the type of product which may be assembled in the machine shown in Fig. 1.

Figure 1:
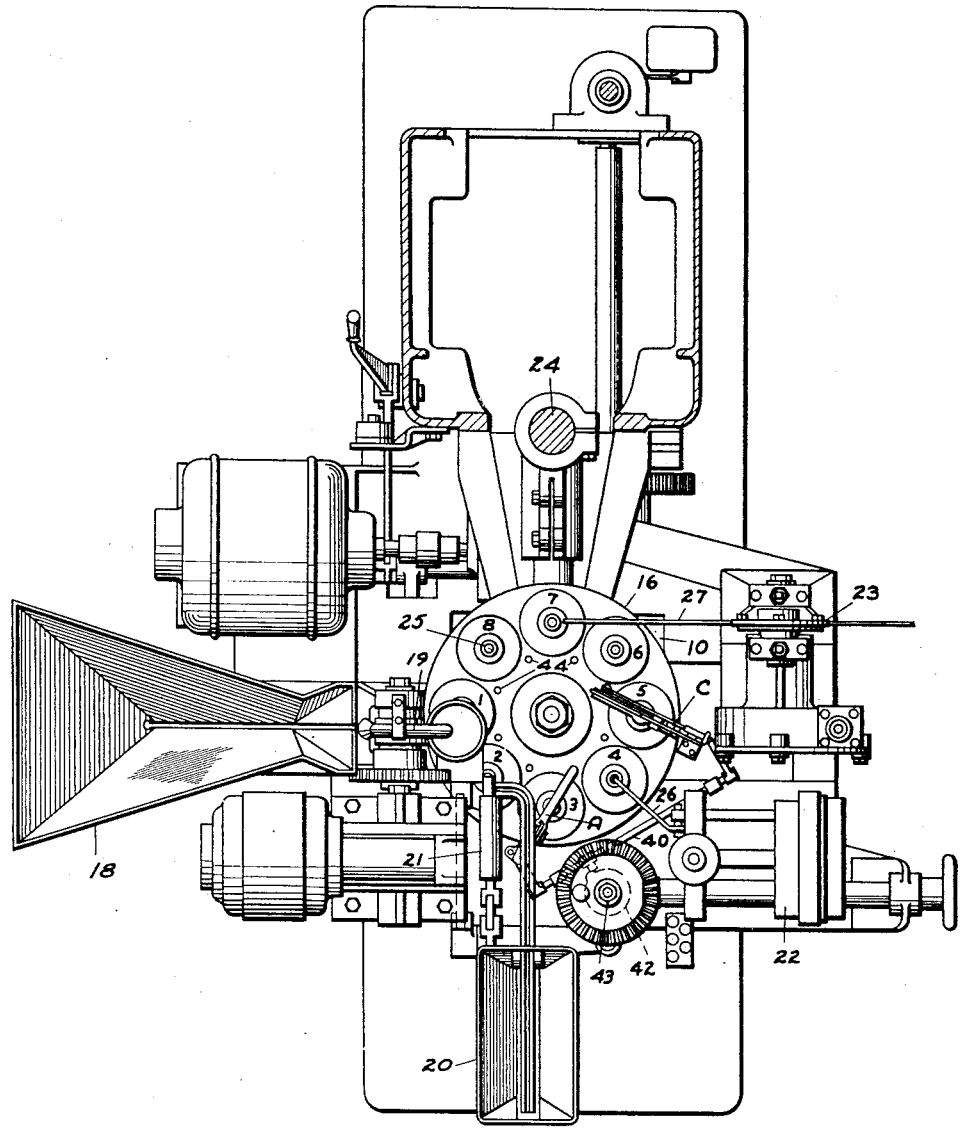
Fig. 1 is a plan view of a fitting assembly machine complete with detecting, rejection and signalling devices constructed in accordance with the invention.

The machine shown in plan in Fig. 1 is an automatic machine for assembling the various parts of a lubricant receiving fitting such as that shown in Fig. 18 and for completing the assembly by welding a wire spring retainer 15 across the end of the fitting shank. The fitting comprises a body 11 having a stepped bore 12 in which is placed a valve 13 and a valve spring 14, held in place by a spring retainer 15 formed of a wire welded to the body 11 across the end of the bore 12. The machine comprises essentially a rotating table 16 provided with eight carriers occupying equally spaced sectors of the table, a hopper 18 and feeding mechanism 19 for the fitting bodies 11, a hopper 20 and feeding mechanism 21 for the valves 13, a spring winding machine 22, a retainer wire feeding mechanism 23, and a welding machine 24, so spaced around the rotating table that they successively perform their individual functions as the table is rotated. The assembly machine is described in detail in the co-pending applicaton of Leland L. Long, Serial No. 678,892, filed July 3, 1933. The sequence of operations of the machine is as follows:

A fitting body 11 is picked up from the hopper 18 and discharged by the feeding mechanism 19 into a receptacle 25 mounted in the center of the carrier at position 1. The table 16 is then rotated one-eighth of a revolution, or 45°, bringing the carrier into carrier position 2, where a valve 13, fed by a mechanism 21 from the hopper 20, is dropped into the fitting body. The table is again rotated, in two 45° steps, bringing the carrier into position 4, where a valve spring 14 wound by the spring-winding machine 22 is dropped through a tube 26 into position over the valve 13 in the bore 12 of the fitting. Further rotation, in three 45° steps, brings the carrier and fitting around to position 7, where a wire 27 fed by a feeding apparatus 23 is placed across the top of the fitting shank and welded thereon, this completing the assembly of the fitting, as shown in Fig. 18. Further rotation of the table through 45° brings the carrier around to position 8 where the completed fitting may be ejected by an air jet.

Carrier positions 3, 5 and 6 are reserved for devices to detect faulty operation of the machine and to prevent completion of the assembly of fittings which in any way are incomplete or defective.

At position 3 a valve-detecting mechanism A is located for detecting the presence or absence of the valve 13. At position 4 is a mechanism B the function of which is to prevent the delivery of a spring by the spring winding machine when a carrier arrives at position 4 without a valve in place within the fitting. At position 5 there is provided a spring-detecting mechanism C for detecting the presence or absence of a spring 14 within the fitting. An ejection mechanism D at position 6 functions to eject imperfect fittings. A mechanism E, at position 7, prevents the functioning of the welding machine when a carrier containing an imperfect fitting arrives at that position, and a second ejection mechanism F at position 8 ejects the completed fittings when they arrive at this position in the course of the rotation of the table. At position 1 there is located another mechanism G functioning to stop the machine in case a predetermined number of fittings are consecutively faulty.

*The valve detecting mechanism*

In the valve detecting mechanism A shown in Fig. 3, a bracket 30 supported on the frame 10 of the assembly machine carries a pivoted arm 31 to which there is attached a small pin 32 adapted to enter the bore 12 of the fitting body 11, the outer end of the arm being bent downward parallel to the pin as shown. Pivoted on the same center as the arm 31 is a second arm 33 provided with a lug 34 for engaging with the arm 31 as shown. A torsion spring 35, one end of which bears on the arm 31 and the other end of which bears upon the arm 33 tends to rotate the arm 31 in a clockwise direction with reference to arm 33, thereby urging the arm 31 into contact with lug 34. A tension spring 36 attached to the bracket 30 and to the arm 33 urges the latter downwardly tending to maintain it in the position 33' shown in dotted lines at which position the lug 34 causes the arm 31 to be raised sufficiently high for pin 32 to clear fitting 11 as shown at 31'. A push rod 37 extending upward through a bore 38 in the bracket 30 contacts at its upper extremity with the under side of the arm 33 and at its lower extremity with a lever or bellcrank 39 rigidly attached to a horizontal shaft 40. A second bellcrank or lever 41 also rigidly attached to the shaft 40 extends downward and bears against the face of a cam 42 rigidly fixed to a vertical shaft 43 driven by gearing from the drive shaft operating the mechanism which rotates the table 16. The latter mechanism is operated by a cam which causes the table to rotate 45° while the drive shaft rotates 100°, then holds the table stationary while the drive shaft rotates 260°. The shaft 43 is geared to rotate at the same speed as the drive shaft and timed so that the cam 42 through the bell cranks 41 and 39 causes the arm 33 to be raised to the position shown each time the table is stopped, thus permitting the arm 32 to drop and to allow the pin 32 to enter the bore 12 of fitting body 11.

Should there be a valve in the fitting, the pin 32 and arm 31 will be stopped in the full line positions shown, the spring 35 permitting the arm 33 to continue rising to its maximum position. If, however, the valve 13 should be absent, the pin 32 and arm 31 would continue their downward motion until the end of the pin strikes the shoulder in bore 12, the outer end of arm 31, at the same time, pushing a rejection pin 44 downward into the position shown by dotted lines. It will be noted that if the feeding mechanism 19 failed to deliver a fitting when this carrier was in position 1 and subsequently a valve was dropped at position 2, the latter would fall through the bore 70 of carrier at position 3, so that when the arm 31 is allowed to drop at position 3, the downward motion of pin 32 would not be arrested and the rejection pin 44 would thus be pushed downward in this case, also.

*The spring detecting mechanism*

In the spring detecting mechanism C, shown in detail in Fig. 3, a bracket 50 supported by the frame 10 of the machine carries a member 51 pivoted at its outer end and also carries a lever 52 pivotally mounted thereon at 53 and carrying at its outer end a link 54 supporting a weight 55 immediately above the adjacent rejection pin 44. The lever 52 is connected at its other end by a slotted link 59 with a crank 60 rigidly mounted on the shaft 40. The link 59 is urged downwardly by a compression spring 61. The lever 52 is also provided with a downwardly projecting arm 56 to which is attached a horizontally projecting pin 57 and an L-shaped clip 58. A horizontally projecting clip 64 is mounted on the member 51 at its free end and is adapted to engage with the clip 58 on the downwardly projecting portion 56 of the lever 52 when the member 51 is at the proper elevation. The member 51 is provided near its center with an upwardly curved projecting lip 62 adapted to engage with the upper end of the spring 14 after disposition in a fitting as the latter is moved on the carrier into carrier position 5 by the rotation of the table. The member 51 is also provided with a sliding weight or rider 63, the position of which is adjustable.

It will be noted that at this stage of the assembly the spring projects a short distance beyond the end of the fitting shank so that it will be partly compressed when the assembly is completed by welding the wire retainer 15 across the end of the fitting shank. When a fitting body containing a valve and a spring of proper strength and properly positioned within the body is in position beneath member 51 the latter assumes the position shown, so that the clip 64 engages with the clip 58. While the table is at rest and all parts are in the position shown in Fig. 3, the link 59 is raised by the cam 42, arm 41, shaft 40 and crank 60. This action, by releasing the shorter end of lever 52, would permit the weight 55 to drop were it not for the fact that rotation of the lever 52 about its pivot point 53 is prevented by the clip 64 engaging with the clip 58. If the spring 14 were absent the member 51 would rest on the body of the fitting as shown in dotted lines, in which position the clips 64 and 58 would not engage, and when the end of lever 52 is released by the operation of the cam 42 and the intermediate linkage, the weight 55 would be free to drop on the rejection pin 44, pushing it downward to its lower or rejection position. Similarly if the spring 14 were too long or too stiff or had caught in some way so that it was not properly seated in the fitting body, the member 51 would be raised to a point where clip 64 would be above the clip 58 and the operation of cam 42 would in this case also cause the rejection pin to be moved to its lower position. During the periods when a fitting is not beneath the member 51 it rests on and is supported by the pin 57, and is thus held in proper position for the projecting lip 62 to engage with the spring 14 as the latter is moved into position by the carrier beneath the member 51.

Indexing for rejection

Figure 2:
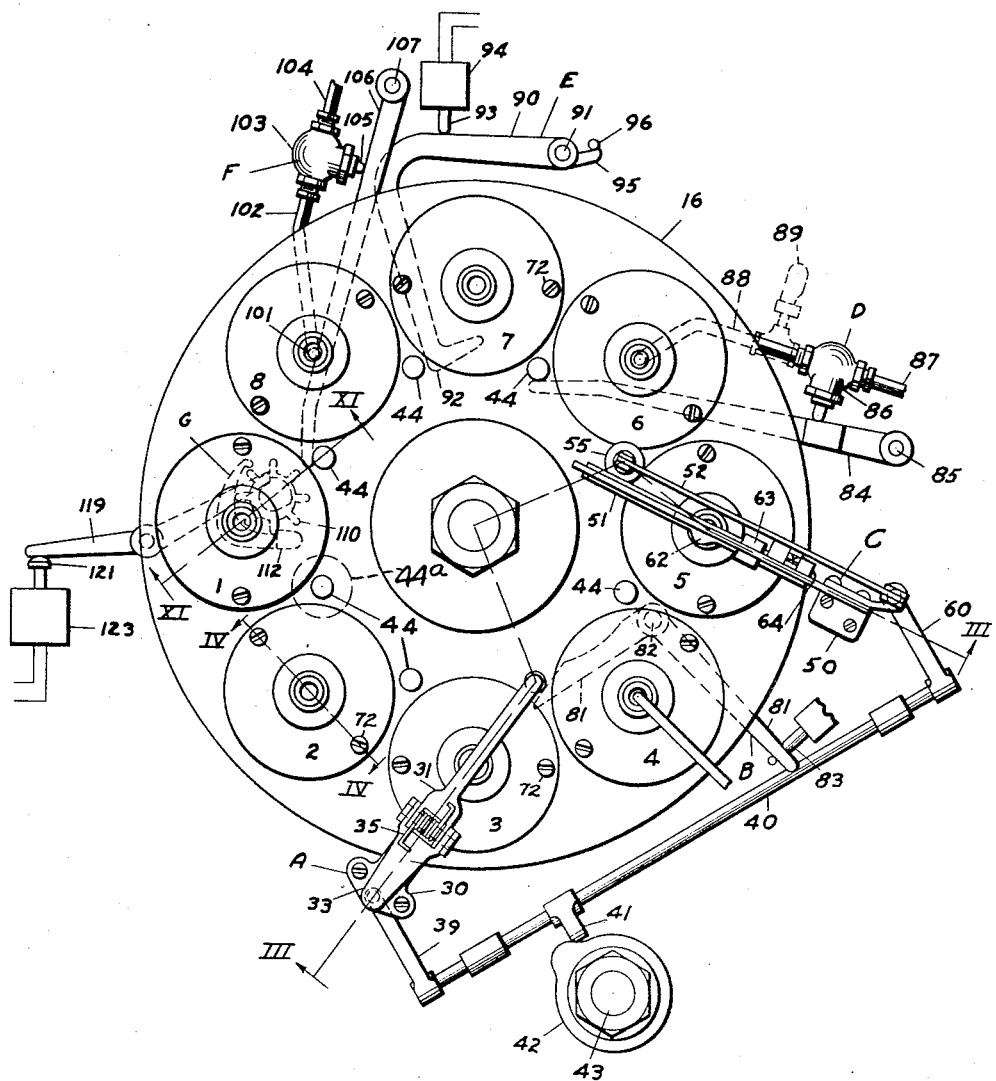
Fig. 2 is a plan view of the table of the assembly machine illustrating the devices in greater detail.

A rejection pin 44 is provided for each carrier as shown in Fig. 2. Each pin is mounted in a vertical bore 45 in the table 16 and is provided with two annular and concave-cylindrical grooves 46 and 47 respectively near its center and a rectangular groove 48 near its lower extremity (see Fig. 11). A plug 66 with a hemispherical end adapted to enter the grooves 46 and 47 is mounted in a horizontal bore 67 in the table 16 and is urged into contact with the rejection pin by a compression spring 68 held in place by a threaded plug 69. The rejection pin is normally in its upper position as shown in Fig. 11 and when pushed down to its lower position shown in Fig. 12 it indicates that the fitting in the corresponding carrier is faulty.

Means for returning the rejection pins 44 to their normal position, as indicated in full lines in Figure 3 comprises a boss 44a carried upon the frame 10 of the assembly machine and having its upper end provided with an inclined surface, 44b, as illustrated in Figure 11, the inclined surface, 44b, being such as to engage with the bottom of the pin as the table 16 is rotated to urge the pin upwardly to a normal position. I prefer to locate the boss 44a beneath the table 16 at a point midway between stations 1 and 2, as indicated in dotted lines in Figure 2.

Withholding valve spring

In the mechanism B, a bellcrank 81 is mounted a short distance beneath the table 16 and pivoted at 82 with one end engaging with a control pin 83 connected with the mechanism of the spring winder 22. When the rejection pin 44 is moved to its lower position by the mechanism mounted above carrier 3, as in the absence of a valve 13 in the fitting at carrier position 3, the subsequent movement of table 16 causes the lower end of rejection pin 44 to engage with the inclined face of the outer end of the bellcrank 81, producing a small counterclockwise rotation of the latter about its axis 82 and through the medium of the control pin 83 and its linkage with the spring winding machine the latter is prevented from functioning. Thus when the carrier from position 3 arrives at position 4 the machine is prevented from supplying a spring for it.

Ejecting imperfect fitting

Figure 5:
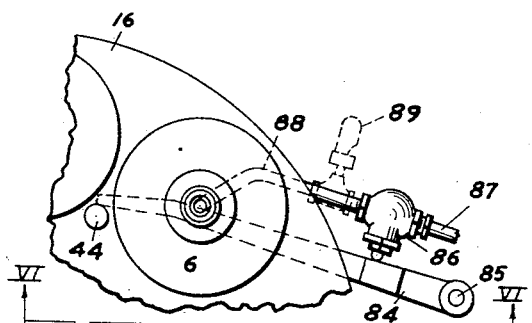
Fig. 5 is a fragmentary plan view of one of the ejecting mechanisms.
Figure 8:
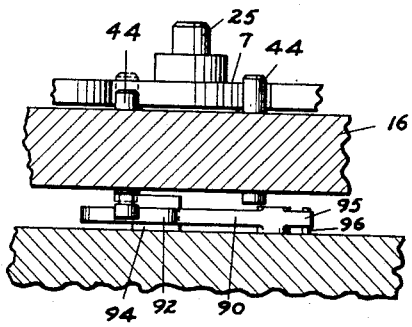
Fig. 8 is a fragmentary sectional elevation along the line VIII—VIII of Fig. 7.
Figure 6:
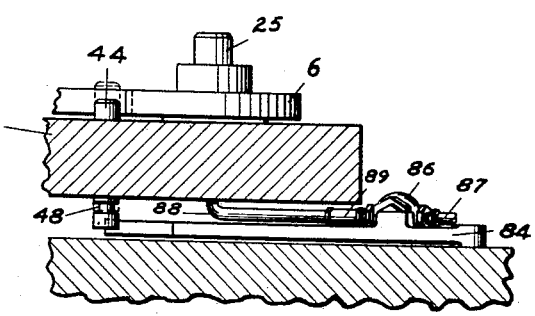
Fig. 6 is a fragmentary sectional elevation along the line VI—VI of Fig. 5.

In the ejection mechanism D, shown in Figs. 5 and 6, a lever 84 is mounted beneath table 16, pivoted at 85 and arranged to engage with the stem of an air valve 86 normally held in its closed position by means of an internal spring not shown (see Fig. 2). The valve 86 is supplied with compressed air through a pipe 87 and has a second pipe 88 leading from its discharge side which terminates in an upwardly directed jet located immediately beneath and on the central vertical axis of the carrier at position 6. The lever 84 is mounted at an elevation slightly below the lower end of the rejection pin 44 when the latter is in its upper position and normally assumes the position shown in Fig. 2. When the rejection pin 44 is depressed to its lower or rejection position its lower end engages with the free end of the lever 84 as the table is rotated bringing the lever 84 into the position shown in Fig. 5, thus opening the valve 86 and admitting air to the pipe 88, to cause a jet of air to be blown vertically upward through bore 70 in the carrier at position 6 and, by the force of the air, to eject the defective fitting therein. An air operated whistle 89 may be connected to pipe 88 as shown by dotted lines to provide an audible signal whenever the valve 86 is opened, thus notifying the operator that a defective fitting is being ejected by the machine.

Welding control after ejection

Figure 7:
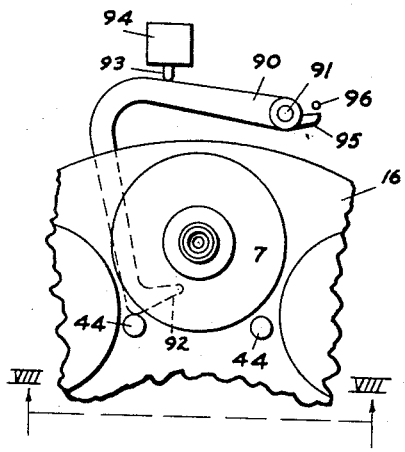
Fig. 7 is a fragmentary plan view of the safety control switch for the welding mechanism.

The mechanism E is mounted beneath the table 16 and includes a lever 90, which is L-shaped as shown in Fig. 7 pivoted to the frame 10 at 91. Its free end is provided with an inclined face 92 for engagement with a rejection pin 44 when the latter is in its rejection or lower position. The lever 90 also engages with a push pin 93 forming a part of a push button switch 94 which is normally closed and connected in series in the current control circuit of the electric spring retainer welder. Normally a spring within the switch 94 not shown urges the pin 93 outwardly against the lever 90 which is prevented from further movement by an extension 95 of the lever engaging with a stop pin 96. In this position the switch 94 is closed and the welding current circuit is in readiness to function in its normal manner. Had the fitting contained in the carrier at position 6 been imperfect in any way detectable by the apparatus previously described, the rejection pin 44 would have been depressed to its lower or rejection position and the fitting ejected by the air blast by pipe 88. As carrier 6 is rotated into carrier position 7, the rejection pin 44 will engage with the inclined face 92 of lever 90 to cause the latter to rotate clockwise about the pivot 91 as shown in Fig. 7, thus forcing the push pin 93 inwardly and causing the switch 94 to assume an open position. The control circuit of the welder is thus opened to prevent any current from being conducted through the welding electrodes. Further rotation of the table causes the rejection pin 44 to slide over the end of the lever 90 to return to its normal position as shown in Fig. 2.

Ejection of completed fitting

The ejection mechanism F, located at carrier position 8, is practically identical with the ejection mechanism D, except that the warning whistle is omitted. Immediately below the carrier, at position 8, and on its central vertical axis, there is mounted an air nozzle 101, pointing vertically upward, which is connected by means of a pipe 102 with a valve 103 and supplied with compressed air through a pipe 104. The valve 103 is normally held in a closed position and may be opened upon the depression of its valve stem 105. A lever 106, pivoted at 107 to the frame 10 engages with the stem 105 and extends beneath the table 16, as shown, to a point immediately beneath the latter so that it may be engaged by the rejection pin 44. Rotation of the table causes the pin 44 to engage the lever 106 rotating it in a clockwise direction about its pivot point thus depressing the valve stem 105 to admit air to the nozzle 101 thereby causing a jet of air to be blown vertically upward through bore 70 to eject the fitting. Suitable means may be provided to divert the fitting into a receptacle.

*Automatic shut down of machine*

In the mechanism G, shown in Figs. 9 and 10, a star wheel 110 is mounted on a vertical shaft 111 beneath the table 16, at such a height as to engage with the lower end of the rejection pins 44 when the latter are in their lower or rejection positions and to clear them when they are in their upper positions. An escape pawl 112 is mounted adjacent to the star wheel 110 on a pivot 113 and is provided with a hook or shoulder 114 adapted to engage with the teeth 115 of the star wheel. The outer end 116 of the pawl is offset as shown so that it may engage with the rejection pins 44 when the latter are in their upper or normal position but do not engage it when they are in their lower or rejection positions, due to the deep annular groove 48. The other end of the pawl 112 is curved and provided with a tooth 117 as shown. A cam 118 is rigidly attached to the star wheel 110. A lever 119, mounted on a vertical pivot 120, engages at one end with the cam 118 and at the other end the lever contacts with a button 121 on the projecting stem 122 of a push button switch 123. The switch is connected, in series, in the control circuit of the motor operating the main drive of the fitting assembly machine, and is normally held in a closed position, but may be opened upon depressing the button 121. A torsion spring 125 on the shaft 111 tends to rotate the star wheel 110 in a counter-clockwise direction, the latter normally being prevented from rotation by the shoulder 124 on the cam 118 engaging with the end of the lever 119. A torsion spring 126 about the pivot 113 urges the longer arm of the pawl 112 toward the star wheel.

Normally the mechanism G is in the position shown in full lines in Fig. 9; the rejection pins 44 being in their normal positions, as they are carried around upon the rotating table 16, do not engage with the star wheel 110; but, successively engaging with the outer end 116 of the pawl 112 to cause the latter to move away from contact with the star wheel for a brief interval as each pin moves past, movement of the star wheel being prevented by the lever 119. When a rejection pin set in its lower position, as a result of a defective fitting, passes the star wheel 110, it will engage one of the projecting teeth 115 of the star wheel, causing the star wheel to rotate in a clockwise direction an amount equal to the space between the teeth or one-eighth of a revolution, return movement of the star wheel being prevented by the pawl 112 engaging with the next adjacent tooth. Should the next succeeding rejection pin be in its normal position, it will not engage with the star wheel 110 but will engage with the extremity 116 of the pawl 112, moving the latter off the star wheel far enough to permit it to rotate until a tooth on the opposite side of the star wheel is stopped by engaging with projection 117 on the other end of the escape pawl. As the rejection pin continues in its circular path by virtue of the rotation of the table, the pawl 112 is released and returned to its normal position by the spring 126, causing the projection 117 to swing outward and release the star wheel which resumes its movement in a counter-clockwise direction until the first tooth again engages the shoulder 114. This occurs at the same time as the shoulder on the cam 118 engages with the end of the lever 119. If, however, several consecutive rejection pins are in their lower or rejection positions, the star wheel may be rotated in a clockwise direction one-eighth revolution, or the space represented by one tooth, for each pin. After four such operations the inclined surface 127 of the cam 118 may contact with the lever 119 and as the fifth consecutive pin engages with the star wheel, rotating it one-eighth turn, the cam will raise the lever 119, causing the latter to depress the button 121 and to open the control circuit of the motor, thereby shutting down the machine.

If any of the rejection pins in their normal position intervene before the fifth pin, in its rejection position, engages with the star wheel, the latter will be stepped back by one tooth for each normally positioned rejection pin. Thus, if any part of the machine, as for example one of the feeding mechanisms, should fail to perform properly and miss three or four times, and then resume normal operation, the defectively assembled fittings would be ejected but the machine would not be shut down. If, however, something more serious should go wrong and some part of the machine should continuously fail to perform correctly, the machine will be automatically shut down.

*Modifications of spring detector*

In Figs. 13, 14 and 15 there is shown another form of the device C for detecting the presence, or absence, of a spring in the fitting body 11. A bracket 131, attached to the frame 10 of the machine, is provided with a horizontal arm 132 extending across and above the center of the receptacle 25 in the carrier at position 5, and has, at its outer end, a downwardly projecting portion 133 in which a contact screw 134 is mounted. A vertically disposed push rod 135 operated by a crank 60 on the shaft 40 in bores 136 and 137 respectively in the bracket 131 is arranged to engage, at its upper end, with a horizontal arm 138 pivoted on the bracket at 139. A horizontally extending arm 144 is also mounted on the pivot 139, and carries at its outer extremity a flat bronze contact spring 146 which is electrically insulated from the arm 144 and connected by an insulated wire 147 with a terminal 148 mounted on a terminal block 149. The arm 138 is provided with a lug 140 normally engaging with pivoted arm 144 after the fashion of the arms 31 and 33 of the mecahnism A. Another bracket 151 is located adjacent to and parallel with the bracket 131, on the frame 10 and carries a pivoted lever 152, the outer end of which is bent downwardly in the manner shown, so as to engage with the adjacent rejection pin 44. A solenoid 153 is connected in series with a lead from a battery or other source of electric power 154 to a connection 155 to the frame of the machine and is provided with a core plunger 156 connected by a rod 157 with the pivoted lever 152. The other lead from the battery, or power source, is connected to the terminal 148. The operation of this device is as follows:

After partial rotation of the table 16 has brought a carrier to position 5 and the receptacle 25 containing fitting body 11 into the position shown in Fig. 13, the cam 42, through the crank 41, the shaft 40, the crank 60 and the push rod 135, causes the outer end of the arm 138 to be raised thereby lowering the lug 140 which in turn permits the arm 144 to drop downward until it makes contact with the spring 14 in the fitting body 11. In this position the contact spring 146 is held out of contact with the contact screw 134 and the circuit through the solenoid remains open. Should the spring 14 be absent, the arm 144 may drop low enough for contact to be made between the contact spring 146 and the contact screw 134, thus completing the circuit from the battery or power source 154 through the solenoid thereby, pulling down the core 156, to cause the outer end of the lever 152 to move downwardly to push the rejection pin 44 into its lower or rejection position.

A further form of device for detecting the presence or absence of a spring in the fitting body 11 is shown in Figs. 16 and 17 wherein a bracket 160, mounted on the frame 10 of the machine, carries two flat springs 161 and 162, the latter being insulated from one another and from the bracket. The spring 161, mounted above the spring 162, is the longer of the two and extends over the central axis of carrier at position 5. One side of the spring 161 is provided with an upwardly curving lip 163, as shown. An insulated stud contact screw 164 mounted on the spring 161 is adapted to make contact with the spring 162. A third contact spring 165 mounted upon the lower end of the bracket 160 and insulated therefrom is bent substantially at a right angle as shown and carries at its extremity a contact shoe 166 having an inclined face, as shown in Fig. 17. A second contact shoe 167 secured to the rim of table 16 is provided for engagement with the shoe 166 when the carrier assumes position 5. Additional contact shoes 167 are attached to the table in corresponding positions for each of the seven remaining carriers. One terminal of a battery, or other source of electric power 168, is connected through the solenoid 153 to the contact spring 162, the other terminal being grounded to the frame. The insulated stud 164 is connected by a wire 169 with the spring 165. In the interval during which the table is being rotated the contact shoes 166 and 167 are not engaged and the solenoid circuit is therefore open. As the table brings a carrier to position 5 as shown the shoe 166 contacts with the adjacent shoe 167, closing the circuit at this point. At the same time, provided there is a valve spring 14 in the fitting body 11, disposed in the receptacle 25 on the carrier, the extended lip 163 of the spring 161 may engage with the exposed end of the valve spring and in so doing becomes raised thus breaking the contact between the contact screw 164 and the spring 162, before the circuit is closed by the contact shoes 166 and 167, as described. If the fitting body contains a spring as it should at this point, the solenoid will not become energized and the rejection pin 44 will not be disturbed. On the other hand, if the spring 14 is absent, the contact screw 164 and spring 162 will remain in contact, and the circuit will be closed through the contact shoes 166 and 167, thereby causing the solenoid 153 to operate to depress the rejection pin 44 to its lower position through the action of the plunger core 156 and lever 152.

*Electrode contact for carriers*

In order to prevent wear on the lower electrode 175 of the welding machine it is desirable that the carriers be mounted at such a height that they will clear the lower or stationary electrode as they swing into position, and that the carrier be depressed to make contact with the lower electrode just prior to turning on the welding current. In previous designs of machines of this type, this has been accomplished by mounting the entire table 16 on a heavy spring and providing a push rod which pushes the entire table downward a short distance to bring the carrier into contact with the stationary electrode at each operation. It will be observed that the operation of the detecting devices shown in Fig. 3 requires that the height of the fitting body 11 be maintained constant and this invention, therefore, contemplates a different form of mounting for the carriers, as shown in Fig. 4. In this figure the carrier is mounted in an enlarged bore 71 in the table 16, centered by shoulder screws 72 secured to the table 16 by cooperating screw threads 73, at their lower ends, and passing through closely fitting bores 74 in the carrier. Springs 75, surrounding screws 72 and recessed in bores 76, urge the carrier upward into contact with the under surfaces of the heads of the screws 72. The light forces applied to the carrier by the mechanisms A and C are insufficient to overcome the springs 76, which are made relatively heavy, and therefore the carriers are held in substantially rigid relationship upon the table 16. However, when the carriers through the rotation of the table move into the welding position, a push rod (not shown) exerts sufficient pressure to overcome the springs 76 causing the carrier 1 to move downward and the contact strap 77 to make contact with the stationary or lower electrode 175.

What I claim is:

1. In a machine of the character described, the combination of a table adapted to rotate about a fixed axis, a plurality of fitting receiving receptacles located one in each predetermined sector of the table, stationary means for delivering a fitting into each of the receptacles of the table, other relatively stationary means for delivering a valve and a valve spring into the fitting in sequence, and means for ejecting the fitting from the receptacle after the receptacle has moved out of registration with the valve and spring, delivering means, should either of said means fail to function.

2. In a machine of the character described, the combination of a table adapted to be rotated about a fixed axis, said table having a plurality of receptacles therein, means for depositing a series of elements in predetermined sequence in said receptacles, a plurality of movable members carried by said table, one for each of said receptacles, means operable upon the failure of the machine to deliver one or all of said elements into said receptacles to alter the position of the movable member associated with the receptacle wherein the omission of an element has taken place, and means actuated by said movable member when in its altered position to eject the contents of the adjacent receptacle.

3. In a machine of the character described, the combination of a table adapted to be rotated about a fixed axis, said table having a plurality of receptacles therein, means for depositing a series of elements in predetermined sequence in said receptacles, a plurality of movable members carried by said table, one for each of said receptacles, means operable upon the failure of the machine to deliver one or all of said elements into said receptacles to alter the position of the movable member associated with the receptacle wherein the omission of an element has taken place, and means actuated by said movable member when in its altered position to eject the contents of the adjacent receptacle, said last named means including a compressed air jet.

4. In a machine of the character described, the combination of a table adapted for movement about a fixed axis, a plurality of receptacles mounted upon said table in annular array, a plurality of rejection pins mounted for movement along an axis parallel with the axis of the table and adapted at times to extend beneath the table and normally to lie substantially within the confines of the bottom of the table, means for depositing a series of articles in sequence in said receptacle during intervals in movement of the table about its axis, automatic means for detecting the presence or absence of said articles in said receptacles during the progressive and intermittent movement of the table and for depressing said pins upon the absence or dimensional deficiency of said elements in said receptacles, and other means actuated by said pins when depressed to eject the contents of that receptacle adjacent to the depressed rejection pin.

5. In a machine of the character described, the combination of a table adapted for movement about a fixed axis, a plurality of receptacles mounted upon said table in annular array, a plurality of rejection pins mounted for movement along an axis parallel with the axis of the table and adapted at times to extend beneath the table and normally to lie substantially within the confines of the bottom of the table, means for depositing a series of elements in sequence in said receptacles during intervals in the progressive and intermittent movement of the table about its axis, automatic means for detecting the presence or absence of said elements in said receptacles after operation of said depositing means and for depressing said pins upon the absence or dimensional deficiency of said elements in said receptacles, other means actuated by said pins when depressed to eject the contents of that receptacle adjacent to the depressed rejection pin, and automatic means for shutting down the machine when a predetermined aggregate of pins have been depressed with respect to a predetermined number of pins permitted to retain their normal position.

6. In a machine of the character described, the combination of a table adapted to be rotated about a fixed axis, said table having a plurality of receptacles therein, means for depositing a series of elements in predetermined sequence in said receptacles, a plurality of movable members carried by said table, one for each of said receptacles, means operable upon the failure of the machine to deliver one or all of said elements into said receptacles to alter the position of the movable member associated with the receptacle wherein the omission of an element has taken place, means actuated by said movable member when in its altered position to eject the contents of the adjacent receptacle, and means operable subsequent to the functioning of said last named means for returning the movable members to their normal positions relative to the table.

7. In a machine of the character described, the combination of a table, automatic means for depositing a plurality of elements in assembled relationship upon the table, power means for operating said automatic means, a detecting device for detecting the failure of said automatic means to deposit one or more of said elements in assembled relationship on said table, and means automatically operable upon a predetermined percentage of failures of said automatic means to function for shutting off said power means.

8. In a machine of the character described, the combination of a table, automatic means for depositing a plurality of elements in assembled relationship upon the table, power means for operating said automatic means, a detecting device for detecting the failure of said automatic means to deposit one or more of said elements in assembled relationship on said table, and means, automatically operable upon a predetermined percentage of failures of said automatic means to function, for shutting off said power means, said detecting device including members visible to an operator of the machine arranged to shift upon the detection of a failure in assembly whereby the operator may be notified of such failure as it occurs.

9. In a machine of the character described, the combination of a table adapted to move throughout a fixed course of travel, means for assembling a lubrication fitting upon the table during the course of travel of said table, a rejection pin movably mounted upon said table, means responsive to the inclusion of a faulty element in said assembled fitting for moving said pin to cause the pin to extend away from the table, and an ejection device having an operating member in the path of the extended portion of said pin for ejecting the fitting assembly upon movement of the pin into engagement with said operating member as the table progresses along its course.

10. In a machine of the character described, the combination of a table adapted to move throughout a fixed course of travel, means for assembling a lubrication fitting upon the table during the course of travel of said table, a rejection pin movably mounted upon said table, means responsive to the omission of an element in the fitting assembly for moving said pin to cause the pin to extend away from the table, and an ejection device having an operating member in the path of the extended portion of said pin for ejecting the fitting assembly upon movement of the pin into engagement with said operating member as the table progresses along its course.

11. In a machine of the character described, an assembly table mounted for rotation, a plurality of receptacles on the table, automatic means for assembling a lubrication fitting within said receptacles including a blank fitting, a valve, and a valve spring, an arm adapted to bear upon said spring as the receptacle bearing the blank fitting, the valve and the spring is caused to move into registration therewith, an ejection device, and electrically operated means for initiating the operation of said ejection device to eject the fitting assembly upon the failure of said spring to withstand the pressure applied thereto by engagement with said arm.

12. In a device of the character described, apparatus for assembling a lubrication fitting and for permanently securing the elements of the fitting in assembled relationship, a rejection device including a movable pin adapted to move along a vertical axis and normally disposed in elevated position, a weight adapted for registration with the top of said pin, and means operable prior to the operation of said securing means for causing said weight to fall upon the pin to depress the pin should said fitting assembly be incomplete or possessed of defective elements.

13. In a machine of the character described, a table adapted for movement throughout a fixed course of travel, a plurality of receptacles on said table at spaced intervals, mechanism disposed along the course of travel of the table for depositing elements of a lubrication fitting in said receptacles including in sequence a blank fitting, a valve, and a valve spring, and automatic means responsive to the failure of the assembly device to deposit a valve in the blank fitting for preventing the subsequent deposit of a spring into the fitting.

14. In a machine of the character described, a table adapted for movement throughout a fixed course of travel, a plurality of receptacles on said table at spaced intervals, mechanism disposed along the course of travel of the table for depositing elements of a lubrication fitting in said receptacles including in sequence a blank fitting, a valve, and a valve spring, automatic means responsive to the failure of the assembly device to deposit a valve in the blank fitting for preventing the subsequent deposit of a spring into the fitting, and an ejection device for ejecting the incomplete fitting assembly from its receptacle subsequent to the operation of said automatic means.

15. In a machine of the character described, the combination of a table adapted for movement, a receptacle on the table for supporting a fitting, means for depositing a valve and a valve spring in said fitting on said table, and automatic means for ejecting said fitting assembly, including the valve and spring, from said receptacle upon a deficiency in the resiliency of said spring.

16. In a machine of the character described, the combination of a table adapted for movement, a receptacle on the table for supporting a fitting, means for depositing a valve and a valve spring in said fitting on said table, and automatic means for ejecting said fitting assembly, including the valve and spring, from said receptacle upon a deficiency in the resiliency of said spring, said last named means being adjustable as to the resilient prerequisite of said spring.

17. In a machine of the character described, the combination of a movable table, means for assembling a lubrication fitting upon the table including a fitting blank, a valve, a valve spring, and a valve retainer, electrical welding means for welding said retainer to the fitting blank, to support and confine the valve and valve spring within the fitting, upon movement of the assembly by the table into registration with the electrodes of said welding means, and means including a switch in the welding current circuit of said welding means adapted to open the circuit upon the failure of said fitting assembly means to assemble all of said elements in a predetermined sequence.

18. In a machine of the character described, the combination of a table mounted for cyclic movement and adapted to support a plurality of fittings thereupon, automatic means stationed along the path of movement of said table for placing a valve, a valve spring, and a valve and spring retainer in and upon the fitting, power means for driving said table and for actuating said automatic means, and means operable after a predetermined aggregate of failures of said automatic means to function, to render said power driving means ineffective.

HARRY R. TEAR.